United States Patent [19]
Childers

[11] Patent Number: 5,268,808
[45] Date of Patent: Dec. 7, 1993

[54] DISK CARTRIDGES MADE FROM UNITARY BLANKS

[75] Inventor: Edwin R. Childers, Tucson, Ariz.

[73] Assignee: International Business Machines Corporation, Armonk, N.Y.

[21] Appl. No.: 990,157

[22] Filed: Dec. 14, 1992

[51] Int. Cl.⁵ .............................................. G11B 23/03
[52] U.S. Cl. ..................................... 360/133; 369/291
[58] Field of Search ....................... 369/291; 360/133; 206/444, 309, 310, 311, 312, 313; 229/68 R

[56] References Cited

U.S. PATENT DOCUMENTS

| | | | |
|---|---|---|---|
| 2,225,048 | 12/1940 | Hasin | 369/291 |
| 2,636,312 | 4/1953 | Martin | 206/309 |
| 3,765,596 | 10/1973 | Garrod | 229/68 X |
| 4,176,744 | 12/1979 | Borzak | 206/310 |
| 4,200,189 | 4/1980 | Hagelberg | 229/68 R |
| 4,755,901 | 7/1988 | Fehrenbach et al. | 360/133 |
| 4,811,152 | 3/1989 | Kishine et al. | 360/133 |
| 4,868,699 | 9/1989 | Kingsbury et al. | 360/133 |

Primary Examiner—Stuart S. Levy
Assistant Examiner—Paul J. Ditmyer
Attorney, Agent, or Firm—H. F. Somermeyer

[57] ABSTRACT

Four embodiments of disk cartridges are described. Each embodiment is made from a unitary blank of foldable material, such as paperboard or plastic. The cartridges are particularly useful for containing and protecting 130 mm optical disks. Shown are interior brackets integrally formed on panels of the cartridges and that extend to and engage a facing panel for both stiffening the cartridge axially of the contained disk and for physically restraining the contained disk from radial movements in the cartridge. The cartridge may have information containing holes. The interior brackets also stabilize the panel immediately adjacent the hole for enabling mechanical hole sensing. An interior bracket is shown as being integral with one end wall of the cartridge. Notches in two side walls of the cartridge are provided for facilitating automatic cartridge handling.

18 Claims, 6 Drawing Sheets

DISK CARTRIDGES MADE FROM UNITARY BLANKS

FIELD OF THE INVENTION

This invention relates to housings (cartridges) for data-storing disks, particularly to those housings formed from a unitary blank consisting of foldable material.

BACKGROUND OF THE INVENTION

Optical data storing disks having a diameter of 130 millimeters (mm) have been housed in cartridges fabricated from plastic materials that are relatively thick. Each cartridge typically has two plastic halves or panels either cold phase bonded or bolted together. Access openings are provided for transducing access to a contained data storing disk. American National Standards Institute and the International Standards Organization have established standards for fabricating such cartridges to facilitate interchange of information between using parties.

It is desired to provide a less expensive cartridge for data storing disks of all types that is capable of meeting the requirements of data interchange afforded by the above-referenced standards. Such less expensive cartridge is particularly suitable for those data storing disks that will be accessed only infrequently during their respective life times. Examples of such data storing disks are software (programming, data bases and the like) distribution disks and data archiving disks.

DISCUSSION OF THE PRIOR ART

The Kishine et al U.S. Pat. No. 4,811,152 shows a low-cost jacket for movably containing a 130 mm so-called floppy magnetic disk. The jacket has access openings for transducing access to the contained disk and for rotating the disk within the jacket for such transducing operations. A removable cover covers the accessing apertures. The contained disk rubs on the inner side of the jacket during transducing operations and does not meet the requirements set forth above. The jacket also appears not to be suitable for present day 130 mm optical data storing disks. Therefore, a low cost cartridge that is substantially different from the floppy disk jacket is desired.

The Henkel U.S. Pat. No. 5,048,681 shows another low-cost jacket for shipping-disks without damage. Such jacket does not provide for transducing access to the contained disk. It is desired to provide a low-cost disk containing cartridge that not only protects a contained disk during shipment, but also provides for transducing access.

The Fehrenbach et al U.S. Pat. No. 4,755,901 shows a floppy disk containing jacket made from a unitary blank made of foldable plastic material. The invention set forth in U.S. Pat. No. 4,755,901 relates to reducing friction between the contained disk and the jacket. It is desired to provide a low cost disk cartridge in which rotation of the disk inside the cartridge is a non-contact rotation, such as required for the above referred to standards.

The Hart et al U.S. Pat. No. 4,883,176 shows a paperboard video cassette housing for containing a two spool video tape mechanism. A stated purpose of the paperboard housing is for limited use video cassettes. The unitary housing has a pair of spring tabs for yieldably urging the contained video tape mechanism toward a housing wall having spool engaging mechanisms for transporting the video tape in a usual manner. It is desired to provide a unitary housing in which movement of the contained data storing element need not be in contained with the housing, such as required by Hart et al.

The Turner U.S. Pat. No. 4,499,995 shows a video disk package in which the contained video disk has to be removed for transducing operations. The housing is also not unitary. It is desired to provide a unitary housing in which data transducing operations may occur in a non-contact movement of a contained data storage medium with the housing.

The Huffine et al U.S. Pat. No. 4,038,693 shows another floppy disk jacket having anti-static properties, i.e., has an electrical conductive element for draining static charges. The desired non-contact medium movement eliminates the need for such anti-static precautions.

Klupt in PCT published application WO 91/07752 (priority U.S. patent application Ser. No. 440,217 and U.S. patent application Ser. No. 440,218, (Nov. 22, 1989) show a disposable video two spool unitary cartridge. Triangular cutouts apparently press against the contained video spool mechanism for pushing same axially of the spools. A pair of rectangular tabs, respectively on facing walls of the container, extend inwardly between the reels. Apparently, the rectangular tabs extend partially toward respective opposing cartridge walls for separating the reels into two enclosures within the cartridge. It is desired to provide for greater stiffness and control of a contained record member than that provided by the unitary cartridge blank for the two spool video cartridge.

SUMMARY OF THE INVENTION

An object of this invention is to provide a blank of foldable material from which a record medium containing cartridge is fabricated that has good control over the physical position of a contained disk and stiffness of the cartridge axially of the contained record member, preferably an optical disk.

A blank and cartridge constructed according to the present invention includes integrally formed internal brackets extending between facing panels of the cartridge for both stiffening the cartridge and for provided record member guides or lateral restraints that limit the lateral movement of a contained record member. A preferred record member is a disk shaped record member. The panels extend in planes that are substantially parallel to the plane surface of the contained disk, one panel on each side of the disk. The spacing between the panels is greater than the axial thickness of the disk. Internal brackets also stiffen the panels in areas containing holes that may be mechanically sensed. An internal bracket may be integrally formed with one of the walls extending between the panels. Gripper or loader notches are provided in one end portion of the cartridge by multi-folds of the foldable material that create two outwardly opening notches. Transducer and drive accessing openings are provided in the cartridge. A spring clip may cover the openings and simultaneously restrain a contained disk for shipment and handling.

The foregoing and other objects, features and advantages of the invention will be apparent from the following more particular description of preferred embodiments of the invention, as illustrated in the accompanying drawings.

DETAILED DESCRIPTION

Referring now more particularly to the appended drawing, like numerals indicate like parts and structural features in the various figures. Identical elements used in the various embodiments retain the same number and perform the same function in the same way as described and shown in an earlier described embodiment.

Figures 1, 2, 3:
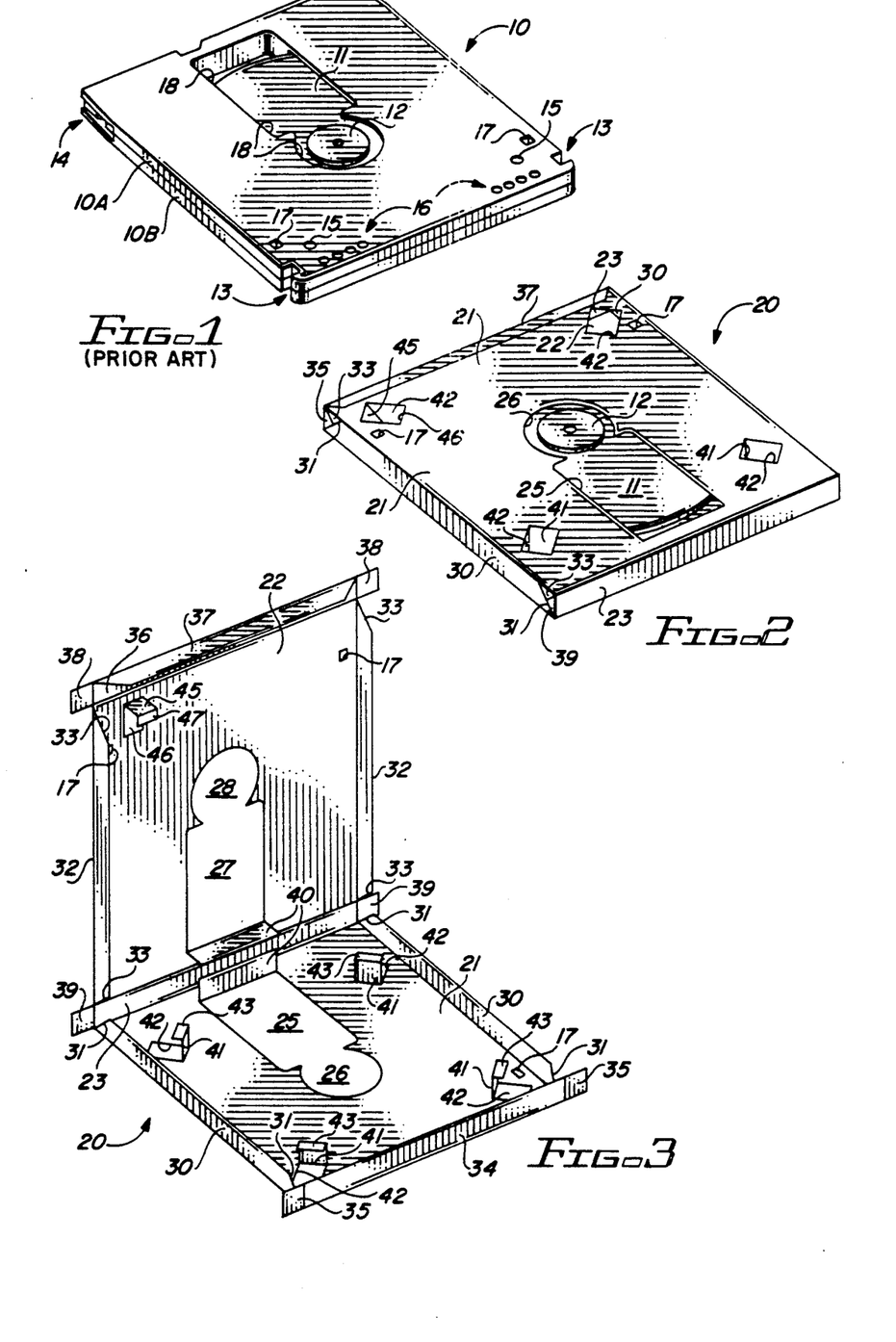
FIG. 1 shows a prior art cartridge consisting of two plastic halves cold-phase bonded to be an enclosure for receiving and rotatably enclosing an optical disk.
FIGS. 2-3 illustrate a first described embodiment of this invention by showing a blank of foldable material to make a low cost cartridge to replace the prior art cartridge shown in FIG. 1 that includes stiffening brackets extending from one panel to a second panel of the cartridge that also rotatably guide the contained disk record member.

FIG. 1 illustrates a prior art cartridge 10 for a 130 mm optical disk 11 that has an annular recording surface on each of its two planar circular surfaces. Spindle 12 on disk 11 is engaged by a play mechanism (not shown) for rotating disk 11 inside cartridge 10. Cartridge 10 is adapted for automatic handling by cartridge gripper notches 13. A cartridge gripper (loader-unloader) (not shown) in a play mechanism may engage cartridge 10 at notches 13 for carrying the cartridge to and from a play mechanism. Additional gripper notch 14 may also be used. Notches 13, 14 extend to both halves 10A and 10B of cartridge 10. Notches 13 and 14 are usable with diverse cartridge grippers or holders. Halves 10A and 10B are molded plastic that are either cold-phase bonded or bolted together. The cartridge is typically 11 mm thick.

Cartridge 10 contains several holes that identify positioning, permitted writing and type of disk 11. Each half 10A and 10B have an identical set of holes. Write protect holes 15 indicate that disk 11 may not be written on (write protected)if the holes are open and that disk 11 may be written on when the holes 15 are covered or not provided in the cartridge. Each recording surface (each face of disk 10 is a separate recording surface) has separate write protect holes. Sets of holes 16 indicate predetermined parameters of disk 11, i.e. write once, read only, magnetooptic, single-sided disk, double-sided disk and the like. Square holes 17 are used for positioning cartridge 10 in a play mechanism. Access opening 18, one opening in each half 10A and 10B provides driving access to spindle 12 and transducing access to the recording surface(s) of disk 11. A shutter (not shown) may be movably disposed to close the access opening when cartridge 10 is outside a play mechanism.

From the above, it is seen that the cartridge is relatively large and heavy. Fabrication of such a cartridge is expensive, particularly to provide heavy usage of disk 11. Accordingly, it is desired to provide a low cost cartridge for those applications wherein such heavy usage is not encountered, such as in software distribution and certain archiving. Four different, but related, embodiments illustrate an inventive approach in making such a low cost cartridge. It is to be understood, that the inventive approach is not limited to 130 mm optical disks, rather the invention is applicable to any size and type of record medium. Many aspects of the invention are not limited to disk shaped record members.

FIGS. 2 and 3 illustrate a first described embodiment wherein a unitary blank (FIG. 3) is folded into a low cost cartridge 20. This first described embodiment dispenses with the prior art gripper notches 13, 14. Cartridge 20 is still usable in an automatic cartridge loader and unloader. The FIG. 3 illustrated blank ca be made of any foldable material such as paperboard or plastic. The fold lines may be identified by reduced thicknesses or perforations to facilitate accurate folding, hence facilitate cartridge fabrication.

First panel 21 is a first face of cartridge 20. Second panel 22 is a second face of cartridge 20. Panels 21 and 22 extend in parallel planes spaced from a contained disk 11 on opposite sides thereof. The planes of panels 21 and 22 are parallel to the plane of the recording surface of disk 11. If a single-sided disk 11 is used, it is preferred that the recording surface face panel 21, such as shown in FIG. 2. Web 23 foldably joins panels 21 and 22 such that the panels folded down, as will become apparent, provides an exterior dimension about 11 millimeters. Panel 21 has transducing access opening 25 joined with drive access opening 26 for respectively enabling transducing access to disk 11 and drive accessing to spindle 12 (FIG. 2). Panel 22 has transducing access opening 27 and drive access opening 28.

Side wall forming flaps 30 extend along the side edges of panel 21 and are foldable upwardly (FIG. 3) to form cartridge 20 with mating side wall forming flaps 32 foldably connected to panel 22. It is preferred that side wall forming flaps 30 and 32 have beveled ends 31 and 33 respectively. End wall forming flaps 34 and 36, respectively on panels 21 and 22, cooperate as the panels 21 and 22 are folded toward each other (FIG. 2) to close one end of cartridge 20. Web 23 and its foldable tabs 39 close the other cartridge end. As best seen in FIG. 2, tabs 39 are positioned inside side wall forming flaps 30 and 32. Tabs 35 and 38, respectively on flaps 34 and 36, fold toward the side wall forming flaps 30 and 32 to form strong corners of cartridge 20. As best seen in FIG. 2, tabs 35 and 38 are folded to be inside of side wall forming flaps 30 and 32. The inside surfaces of side wall forming flaps 30 and end wall forming flap 34 may have a pressure sensitive adhesive for adhesively securing the flaps together for making the cartridge 20. Other forms of boding may also be used. End wall forming flap 36 may have a lip 37 foldably formed thereon for engaging panel 21 outer surface as end wall forming flap 36 covers end wall forming flap 34. The inner surface of lip 37 may have the pressure sensitive adhesive for securing the one end of cartridge 20.

The interior constructional features of cartridge 20 are an important aspect of the present invention. A pair of inwardly folding stiffening brackets 40 formed from transducing openings 25 and 27, respectively are secured together for stiffening cartridge 20 at an outer end of the transducing openings. Panel 21 has four integrally formed brackets 41 cut from panel 21 to form holes 42. Each bracket 41 has a foot 43 foldably formed at the distal end of each bracket 41 for engaging panel 22 to stiffen cartridge 20. The surface of foot 43 facing panel 22 may have pressure sensitive adhesive thereon. Brackets 41 not only stiffen cartridge 20 axially of disk 11, but also position disk 11 within cartridge 20 such that disk 11 is properly positioned for enabling drive engagement of spindle 12 with a drive mechanism (not shown). For enabling non-contact rotation of disk 11 in cartridge 20, diametric spacing of brackets 41 is slightly greater than the diameter of disk 11, such as one millimeter greater distance. FIG. 3 illustrates brackets 41 being on two orthogonal diameters. Three brackets 41 may be used with the radial spacing of the brackets 41 from a center (not shown) of disk 11 being greater than the radius of disk 11 by a small amount, such as 0.5 mm Brackets 41 need not be formed on the same panel, rather, as seen later, brackets 41 may be formed on either panel so long as the brackets extend axially of disk 11 to engage the other panel.

Interior panel-connecting brackets may also be employed for added stiffening in the area of holes 15 and 16 for facilitating mechanical sensing of the holes. Bracket 45 formed out of panel 22 leaving hole 46 and having foot 47 engages panel 21. Hole 46 encompasses an area of panel 21 that in prior art cartridge 10 uses for write protect hole 15. Therefore, this embodiment is preferably for a read only disk or a continuously protected writeable disk (such as program containing, archive and the like). Of course, covering hole 46 with an exterior tape (not shown), such as a self-adhesive tape, disables the write protect feature. Later-described cartridge 50 is one example of a cartridge that does not write-protect an enclosed re-writeable disk.

Figures 4, 5, 6:
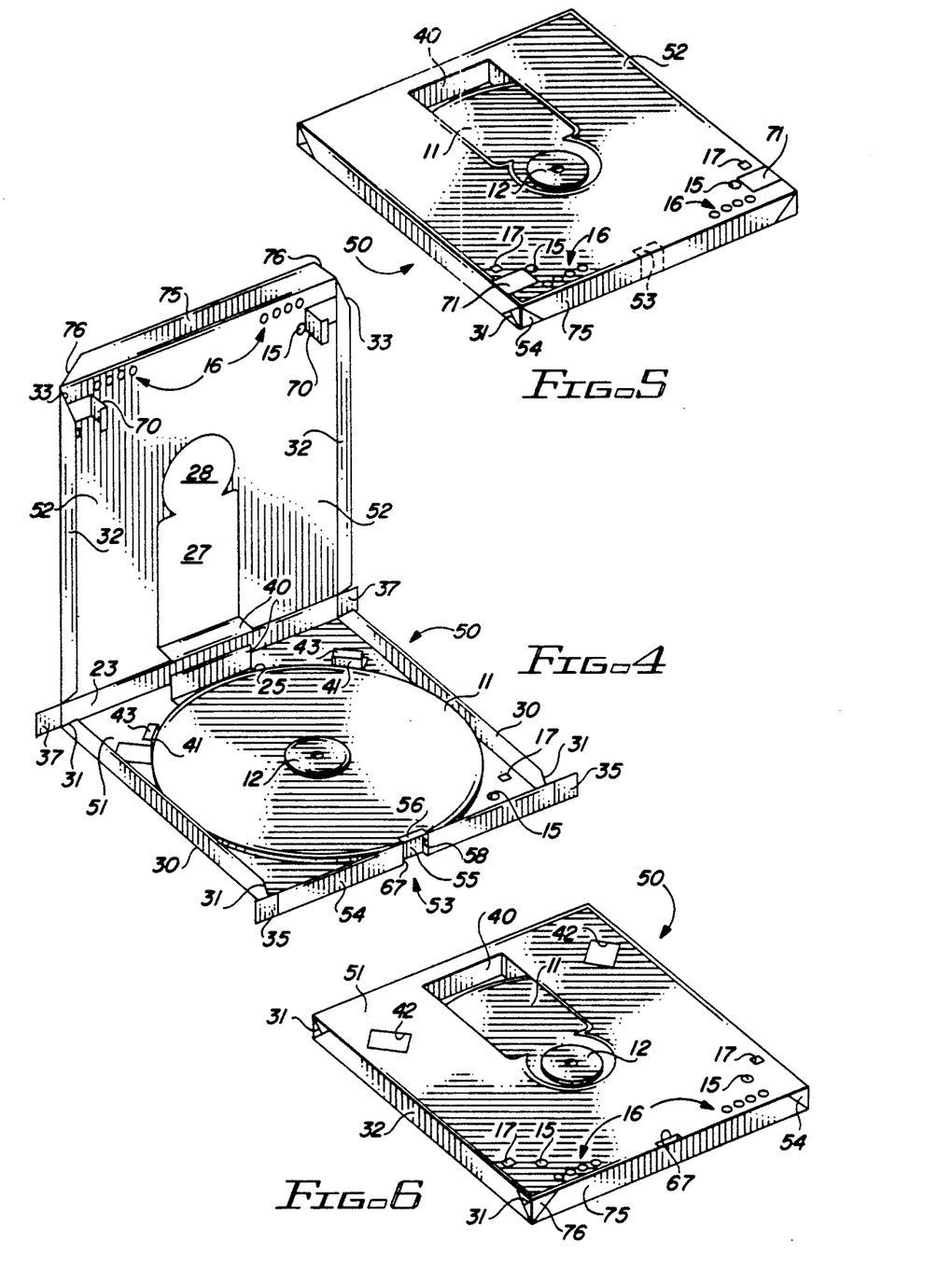
FIGS. 4-9 illustrate a second described embodiment of this invention in which a combined disk guide or lateral restraint and stiffening bracket is incorporated into an end wall of a completed cartridge.

FIGS. 4–9 illustrate a second described embodiment of the present invention creating cartridge 50 from a unitary blank shown in FIG. 4. The second described embodiment retains many of the features of the first described embodiment. The retained features are not further described. Panels 51 and 52 respectively replace panels 21 and 22 of the first described embodiment. A change in panel 52 provides two brackets 70 instead of one stiffening bracket 45. Brackets 70 are each formed from panel 52 leaving hole 71 and each have a foot portion for engaging the inside surface (not numbered) of panel 51. Both brackets 70 on panel 52 are disposed adjacent a hole to be sensed. A second change in panel 52 is that end forming flap 75 has beveled ends 76. Panel 51 has but two disk-guiding or restraining and stiffening brackets 41 and a third disk-guide/stiffening bracket 53 formed in end forming flap 54. These three brackets are shown as being circumferentially displaced by 90 degrees and 135 degrees, as best seen in FIG. 4. Bracket 53 is disposed on an axis (not shown) that dissects the 90 degree angle between brackets 45 on panel 51. The angle between brackets 45 on panel 51 may be less than 90 degrees.

Figures 7, 8:
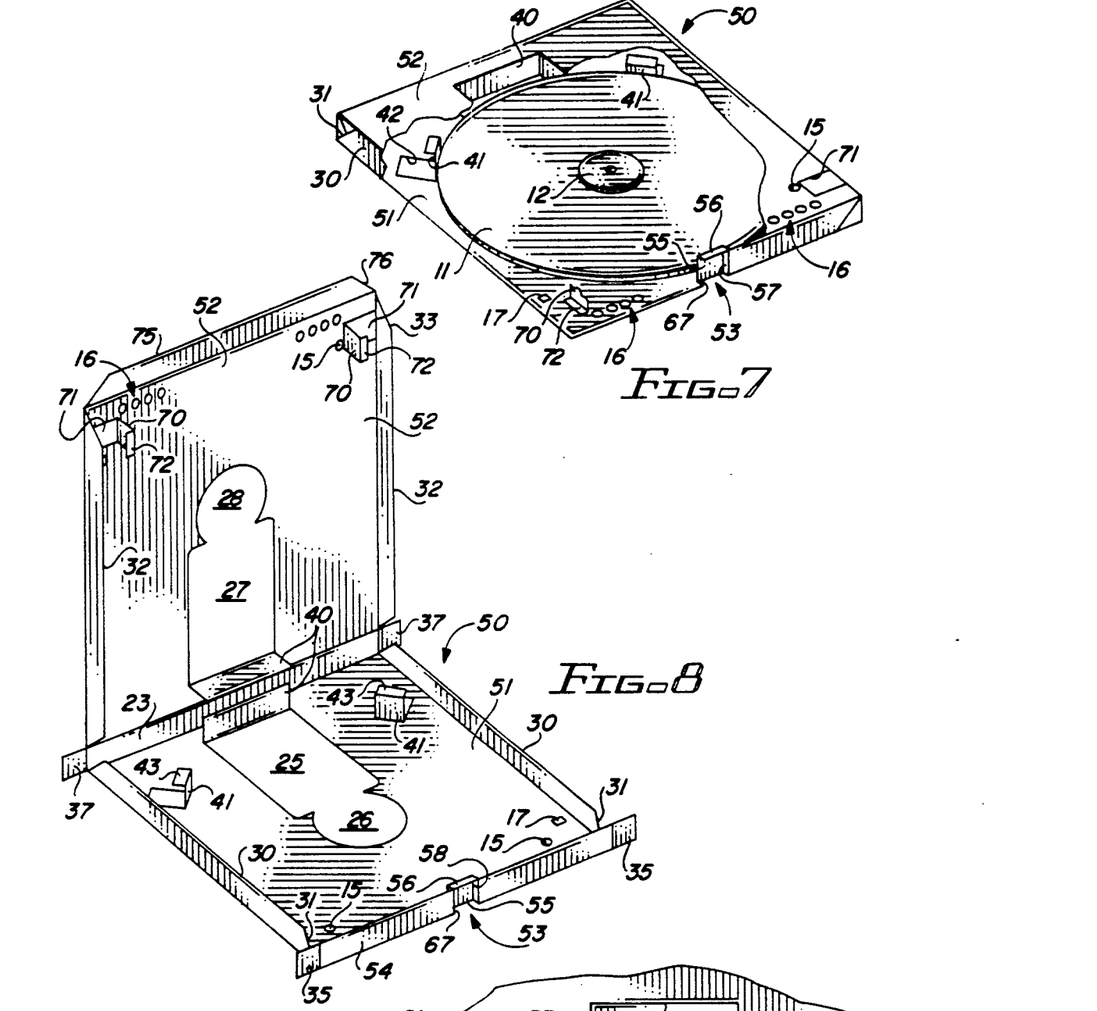
Figure 9:
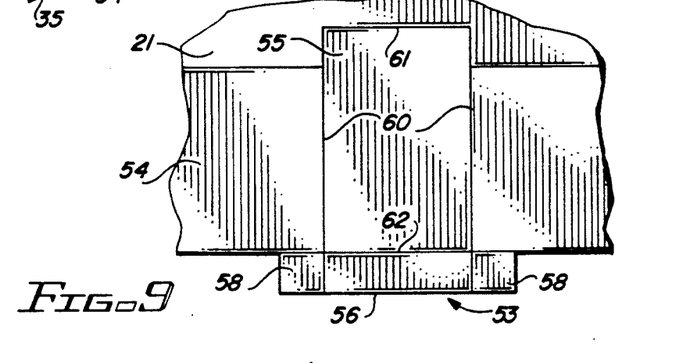

Bracket 53 is best understood by referring to FIG. 9. Bracket 53 consists of main portion 55 and foot portion 56. Lines 60 indicate the cuts to form main portion 55. Foot portion 56 is folded along line 62 for providing a good engagement with the inside surface (not numbered) of panel 52 (FIG. 4). Tabs 58 may be added to add stiffness. Tabs 58 extend between main portion 55 and end forming flap 54 as best seen in FIG. 8. The bracket 53 is completed as end wall forming flap 75 is folded on panel 52 and the inside surface of flap 75 engages the outer surface of end wall forming flap 54, as best seen in FIGS. 5 and 6. A small slot 67 (FIG. 6) remains between end wall forming flap 75 and panel 51.

Figures 10, 11:
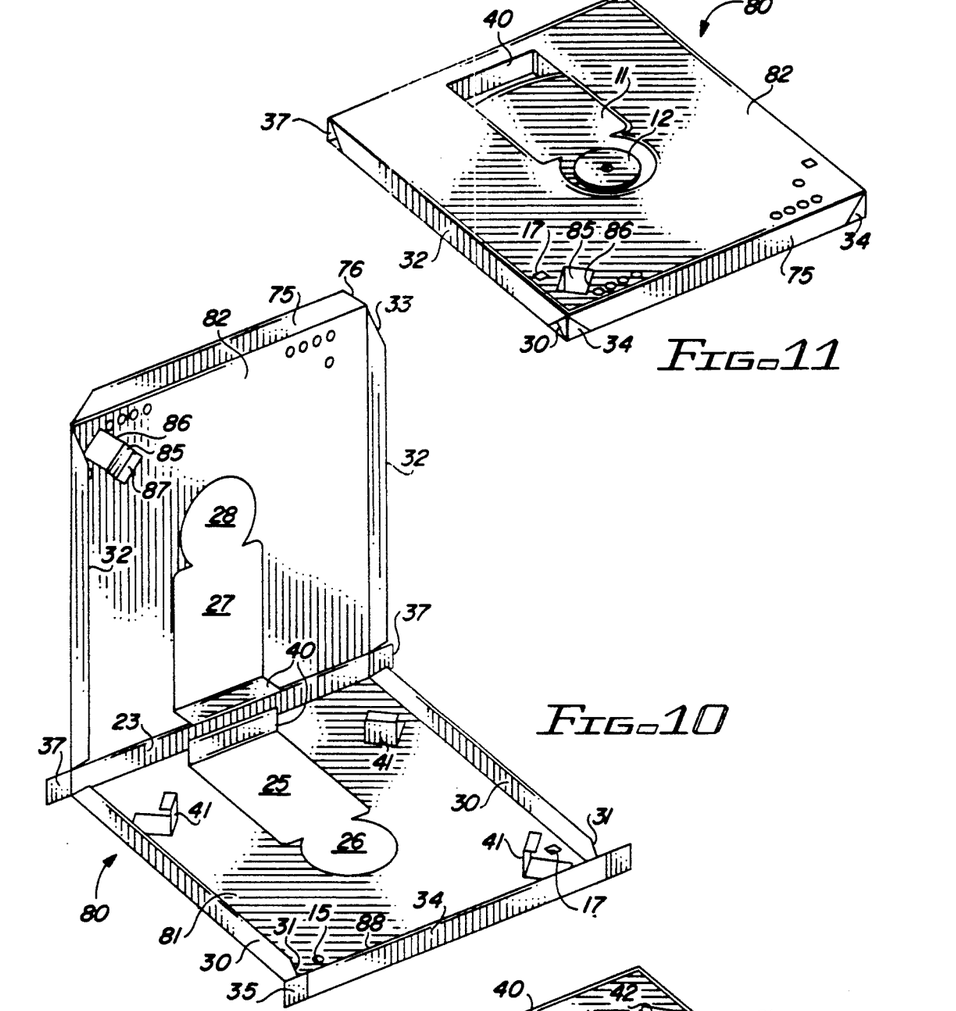
FIGS. 10-14 illustrate a third described embodiment of this invention in which a stiffening bracket on one panel is disposed to stiffen the facing panel adjacent a hole that is to be machine sensed.
Figure 12:
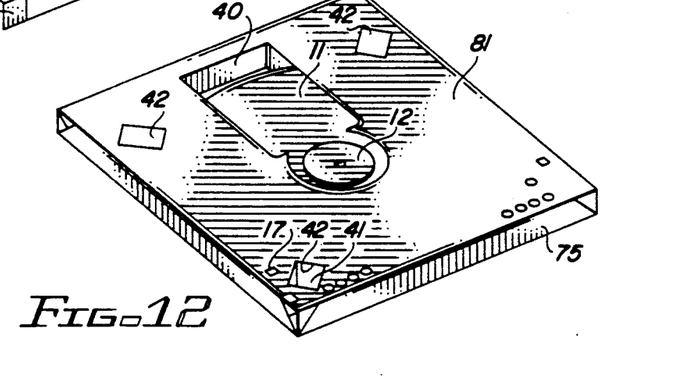
Figure 13:
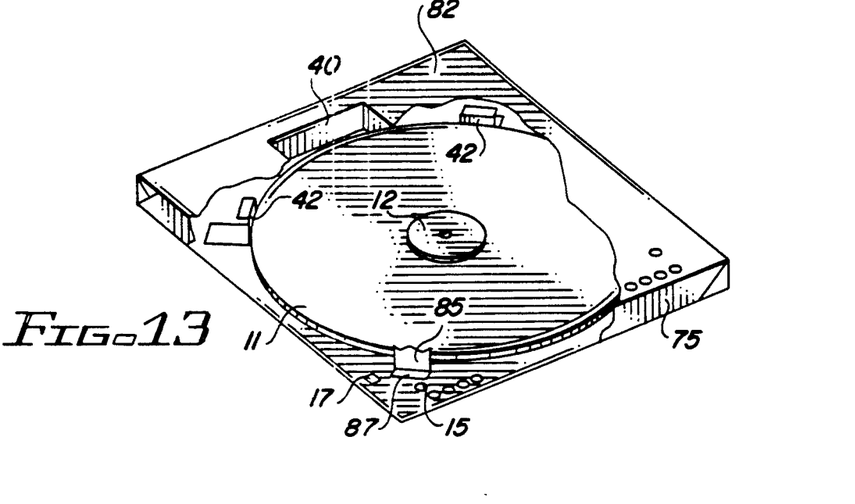
Figure 14:
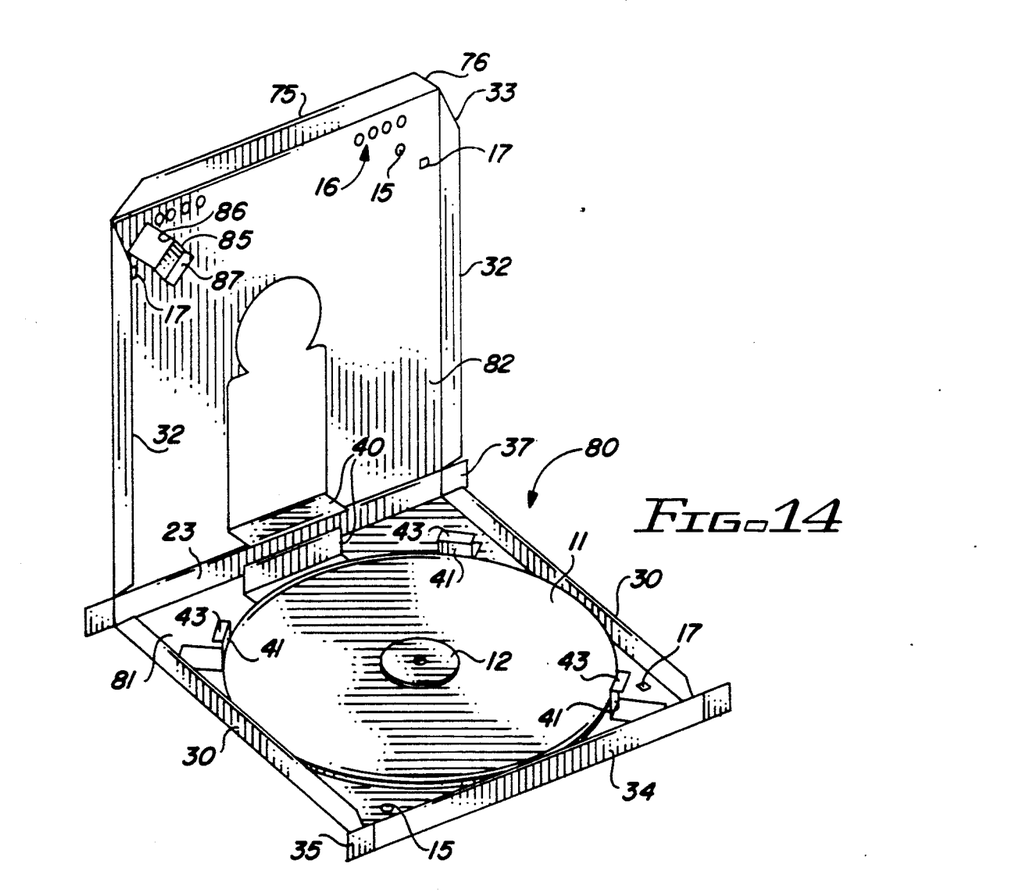

FIGS. 10–14 illustrate a third described embodiment that also retains many features of the first described embodiment. The cartridge 80 is formed from a unitary blank that is best seen in FIGS. 10 and 14. The unitary blank has first panel 81 and second panel 82. Three brackets 41 are formed from first panel 81. A fourth guide or lateral restraint and stiffening bracket 85 is formed in one corner portion of second panel 82. Hole 86 is created by forming and bending bracket 85 and its foot 87. Foot 87 in cartridge 80 engages first panel at area 88 for stiffening panel 81 adjacent hole 15. Bracket 85 is one a diameter with one of the three brackets 41, as best seen in FIGS. 10 and 14.

Cartridge 80 enables closing or opening write protect hole 15. Cartridges 20 and 50 provided for a continuously open write protect hole 15 (always write protected unless the hole is covered with an exterior self-adhesive tape, for example). Cartridge 80 enables one of the write protect holes 15 to be covered from the interior, as will become apparent.

Figure 15:
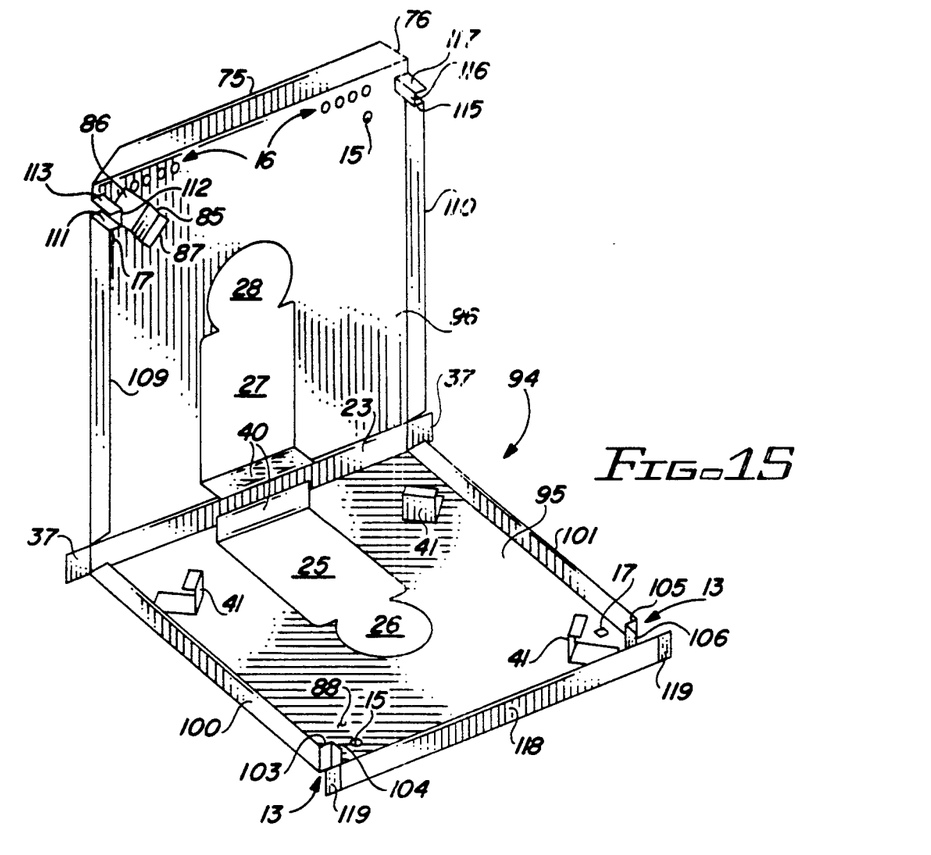
FIGS. 15-16 illustrate a fourth described embodiment of this invention that provides a pair of cartridge-gripper/holder notches.
Figure 16:
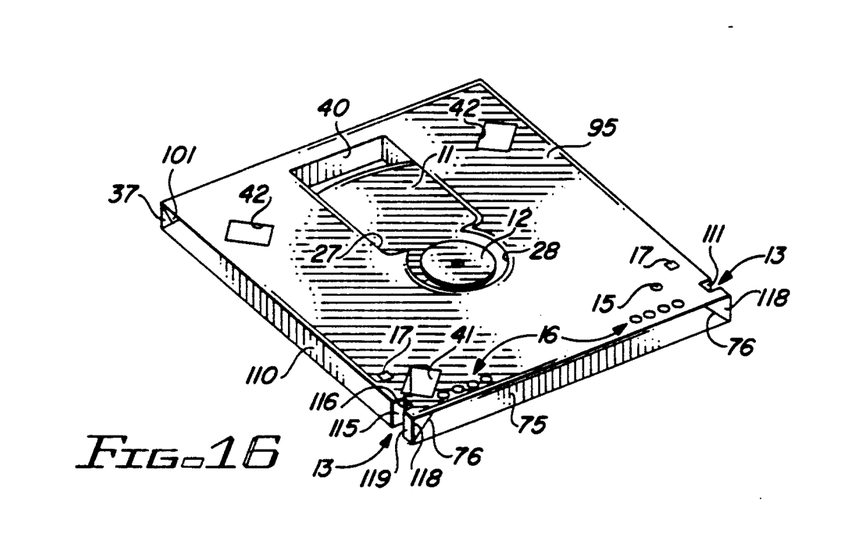

FIGS. 15 and 16 illustrate a fourth described embodiment that includes gripper notches 13 as shown in FIG. 1 prior art cartridge. Cartridge 94 consists of a unitary blank (FIG. 15) having a first panel 95 and a second panel 96 joined by web 23. Panels 95 and 96 fold toward each other to cover optical disk 11 to form cartridge 94. First panel 95 has three internal disk lateral restraining and stiffening brackets 41 disposed as shown. A fourth disk radial or lateral restraint and cartridge stiffening bracket 85 is formed on panel 96 leaving hole 86 and having foot 87. Foot 87 engages the inside surface (not numbered) of first panel 95 at area 88 for stiffening panel 95 in the area of write protect hole 15. This arrangement provides four brackets disposed as shown in the first described embodiment excepting that one of the brackets (85) is formed on second panel 96 rather than the first panel 95. The effect on contained disk 11 is the same.

Side wall forming flaps 100 and 101 on first panel 95 each having a notch forming portion that cooperates with end wall forming flap 118 and its tab 119. Note that tabs 119 are shorter than tabs 35 on end wall forming flap 34 of the first described embodiment. Side wall forming flaps 109 and 110 on second panel 96 each have notch forming end portion that cooperates with respective notch forming end portions of side wall forming flaps 100 and 101 and tabs 119 to complete two notches 13 that are substantially identical to the notches 13 in prior art cartridge 10. Side wall forming flap 100 has inwardly extending notch wall 103 that supports a transversely extending inner notch wall 104. Similarly, side wall forming flap 101 has inwardly extending notch wall 105 that supports transversely extending inner notch wall 106. The notch forming ends of side wall forming flaps 109 and 110 have inwardly extending notch walls 111 and 115 that each support transversely extending inner notch walls 112 and 116. Additionally outwardly extending notch walls 113 and 117 extend transversely from inner notch walls 112 and 116, respectively. Side wall forming flaps 100 and 101 on first panel 94 fit inside the second panel 95 side wall forming flaps 109 and 110 such the respective notch forming portions 111–113 and 115–117 nest inside the respective notch forming portions 103–104 and 106–107. Tabs 119 engage the outer ends of the outwardly extending notch walls 113 and 117 to complete notches 13 in cartridge 94. The outwardly extending notch walls 113 and 117 are adhesively secured to the outer ends (not numbered) of tabs 119 to make secure notches 13. Cold phase bonding may also be used, particularly if the blank for cartridge 94 consists of a foldable plastic sheet. It is to be understood that all the notch walls and flaps are initially on one plane that includes web 23 plus the first and second panels 95 and 96 plus all of the flaps. The double walls formed by notch walls 103-104 and 105-106 with notch walls 111-112 and 115-116 provide a desired stiffness for certain automatic cartridge handlers. Other cartridge handlers may not require the doubled notch walls.

The brackets 41, 45, 70 and 85 may have "feet" respectively replacing the illustrated feet 43, 47, 56, 72 and 87 with tabs that extend through slits (not shown) in respective panels facing the brackets. The tabs extend through the facing panels, respectively, to be cold phase bonded thereto. This alternative arrangement is particularly suitable for foldable plastic cartridge-forming blanks. Similarly, the notches 13 can be fabricated using different notch wall arrangements and cold phase bonding. Each of the tabs 119 may have a foot (not shown) that extends inwardly of the formed cartridge 94 to form a double notch wall with outwardly extending notch walls 113 or 117.

Since no shutter is provided with the cartridge, a spring U-shaped cover (not shown) may slide onto the cartridge to cover the access openings 25-26 and 27-28. Such a U-shaped spring cover (not shown) can also have foam or supporting features for stabilizing the position of disk 11 inside the cartridge (20, 50, 80 or 94) for shipment and other handling of the cartridge.

While the invention has been particularly shown and described with reference to preferred embodiments thereof, it will be understood by those skilled in the art that various changes in form and details may be made therein without departing from the spirit and scope of the invention.

What is claimed is:

1. A unitary blank of foldable sheet material for use in making a housing to enclose a disk record member having a hub means for enabling free rotation of the enclosed disk record member; the improved unitary blank for making a housing, comprising:
   first and second rectangular panels;
   a web having a dimension greater than a axial thickness of a disk record member to be enclosed in a cartridge formed by said blank, said web being integral to and disposed between said first and second panels such that the first and second panels are separated a distance equal to said dimension;
   one of the panels having a drive access opening coaxial with a hub of the disk record member to be enclosed and a transducer access opening for exposing a radial portion of the disk for enabling a transducing access to the disk;
   a pair of side wall forming flaps extending coextensively with and being on opposite sides of each of said panels;
   an end wall forming flap at a distal end of one of the panels and extending longitudinally coextensively with the panel; and
   a plurality of brackets integrally formed with the first panel for being folded toward and engaging said second panel to stiffen the housing made by folding the panels to face each other and said brackets being disposed in predetermined spaced-apart relationship on the first panel substantially at circumferentially spaced-apart locations on a circumferential periphery disk record member to be enclosed by a cartridge formed by said blank for limiting radial movements of the enclosed disk record member, a foot on each of the brackets, each said foot being foldable to engage said second panel for maintaining a spacing between the panels axially of the enclosed disk record member greater than a maximum axial dimension of the disk record member.

2. In the blank set forth in claim 1 further including, in combination:
   one of said brackets being formed on said second panel for extending to and engaging said first panel and positioned on said second panel in one of said circumferentially spaced apart locations.

3. In the blank set forth in claim 1 further including, in combination:
   each of said side wall forming flaps on one of said panels having an outwardly facing notch forming end portion, each end portion having a first notch wall as an inwardly extending notch wall and a second notch wall foldably attached to said first notch wall as an inner notch wall extending in a plane of a formed cartridge that is parallel to a plane in which the respective side wall forming flap is positioned.

4. In the blank set forth in claim 1 further including, in combination:
   one of said end wall flaps having a center portion for lateral restraining said disk record member, said center portion having a first portion extending transversely to a longitudinal extent of said one end wall flap and having longitudinal edges cut with said cuts extending into one of the panels that supports said one end wall flap for enabling the first portion to be folded to extend transversely to said one panel and in a parallel space relation to the one end wall as it is folded to be transverse to said one panel and foldable second portion attached to a distal end of said first portion for extending from said first portion outwardly of a formed cartridge in a space parallel plane to the plane of said one panel for forming said one bracket integrally with said one end wall flap.

5. In the blank set forth in claim 1 further including, in combination:
   a tab foldably attached to said one of the panels at said transducing access opening for being folded inwardly of a cartridge for stiffening the one panel at said transducer access opening.

6. In the blank set forth in claim 1 further including, in combination:
   said transducer access opening being disposed adjacent said web; and
   a tab foldably attached to said one of the panels at said transducing access opening for being folded inwardly of a cartridge for stiffening the one panel at said transducer access opening.

7. In the blank set forth in claim 1 further including, in combination:
   a second one of said panels having a second transducer access opening for exposing a second predetermined radial portion of said disk record member;

each of said transducer access openings being disposed adjacent said web; and a pair of opening tabs respectively foldably attached to said panels and extending into said transducer access openings, respectively, and being foldable inwardly from an edge of the respective transducer access opening nearest said web such that the tabs in said pair of opening tabs overlap in a cartridge formed by said blank.

8. A disk cartridge consisting of a unitary blank of foldable material and containing a data storing disk having an annular recording surface, including in combination:

a first panel disposed in a plane spaced from and facing said disk and extending substantially parallel to said recording surface of said disk;

a second panel disposed in a plane spaced from said disk on a side opposite to the side facing said first panel and extending substantially parallel to said recording surface of said disk;

a web integrally formed with both of said panels for joining said panels at a first end of said disk cartridge and extending in a plane transverse to the planes of said panels;

a plurality of side wall means each extending coextensively to said panels and each said side wall means being integrally formed with a one of said panels and all of said side wall means extending transversely to the plane of said disk;

end wall means integrally formed with one of said panels at an end of the cartridge opposite said one end and extending transversely to said plane of the disk;

tab means at each corner of the cartridge integrally formed respectively with one of said wall means for closing said corners and joining ones of said wall means disposed adjacent the respective corners together;

one of the panels having a first transducing access opening exposing said annular recording area for a transducing access and a drive access opening for exposing a predetermined center portion of said disk for enabling a drive access to the disk; and a plurality of spaced apart brackets inside the cartridge each of which are integrally formed with said first panel and extend axially of the disk engaging said second panel, predetermined ones of said brackets being disposed adjacent and being circumferentially spaced apart along a periphery of the disk for simultaneously stiffening said data cartridge axially of said disk and restraining said disk from predetermined radial motions.

9. The disk cartridge set forth in claim 8, further including, in combination:

a bracket integral to said second panel and extending to and engaging said first panel and being disposed in a predetermined position with respect to said spaced apart brackets for radially restraining said disk.

10. The disk cartridge set forth in claim 8, further including, in combination:

one of the panels having a hole that is mechanically sensed by a player holding the cartridge; and a bracket integral to said first panel and extending to and engaging said second panel and being disposed in a predetermined position adjacent said hole for stiffening said one of the panels against movement axially of the disk.

11. The disk cartridge set forth in claim 8, further including, in combination:

a second one of the panels having a second transducing access opening for exposing a predetermined portion of said annular recording area for a transducing access;

said openings being disposed on the respective panels at the periphery of said disk and adjacent said web;

a pair of tabs respectively on said panels at a predetermined edge of the respective access openings, said edges being radially outward of an outer periphery of said disk and folded inwardly from the respective panels and engaged for stiffening the panels adjacent said transducing access openings.

12. The disk cartridge set forth in claim 8, further including, in combination:

each of said spaced apart brackets having a foot portion at a respective distal end of the respective bracket that is folded to be parallel and engaging an inside surface of said second panel.

13. The disk cartridge set forth in claim 8, further including, in combination:

each of said side wall means on one of said panels having a outwardly facing notch forming end portion, each end portion having a first notch wall as an inwardly extending notch wall and a second notch wall foldably attached to said first notch wall as an inner notch wall extending in a plane of a formed cartridge that is parallel to a plane in which the respective side wall forming flap is positioned.

14. The disk cartridge set forth in claim 8, further including, in combination:

said end wall means having a center portion for radially restraining said disk record member, said center portion having a first bracket portion extending transversely to a longitudinal extent of said one end wall flap and having longitudinal edges extending into one of the panels that is integral with said one end wall means first bracket portion folded to extend transversely to said one panel and in a parallel spaced relation to the one end wall means and said second bracket portion attached to a distal end of said first bracket portion for extending from said first bracket portion outwardly of the cartridge in a spaced parallel plane to the plane of said one panel.

15. A cartridge containing a data-storing disk, the cartridge being formed from a unitary blank of foldable sheet material, the disk having an annular recording means and a central drive means for rotating the disk about an axis, comprising:

a pair of first and second rectangular panels spaced apart from each other and interconnected by a pair of side walls and a pair of end walls to form a closed box-like cartridge;

the first panel having a transducing access opening for exposing a first predetermined portion of the annular recording means for enabling a transducing access to the disk;

a plurality of brackets integral to the first panel, said plurality of brackets being spaced apart circumferentially of said disk and spaced from the disk a predetermined distance for enabling non-contact rotation of the disk inside the cartridge while restraining the disk from predetermined undesired radial motions, each of said brackets extending to and engaging said second panel for stiffening said panels axially of the disk a bracket integral to said second panel and extending to and engaging said first panel and being disposed in a predetermined position with respect to said spaced apart brackets for radially restraining said disk and stiffening the panels axially of the disk;

one of the panels having a hole that is mechanically sensed by a player holding the cartridge; and a bracket integral to said first panel and extending to and engaging said second panel and being disposed in a predetermined position adjacent said hole for stiffening said one of the panels against movement axially of the disk.

16. The cartridge set forth in claim 15, further including, in combination:

a second one of the panels having a second transducing access opening for exposing a predetermined portion of said annular recording means for enabling a transducing access to the disk;

said openings being disposed on the respective panels at the periphery of said disk and adjacent one of said end walls;

a pair of opening tabs respectively on said panels at a predetermined edge of the respective access openings, said predetermined edges being radially outward of an outer periphery of said disk and folded inwardly from the respective panels and engaged for stiffening the panels adjacent said transducing access openings.

17. The cartridge set forth in claim 15, further including, in combination:

each of said side walls having a outwardly opening notch forming end portion, each end portion having a first notch wall as an inwardly extending notch wall and a second notch wall foldably attached to said first notch wall as an inner notch wall extending in a plane of a formed cartridge that is parallel to a plane in which the respective side wall is positioned.

18. The cartridge set forth in claim 15, further including, in combination:

one of said end walls having a center portion for radially restraining said disk, said center portion having a first bracket portion extending transversely to a longitudinal extent of said one end wall including attached to one of the panels inwardly of said one end wall, the first bracket portion folded to extend transversely to said one panel and in a parallel spaced apart relation to the one end wall, said second portion being attached to a distal end of said first bracket portion for extending from said first bracket portion outwardly of said cartridge in a spaced parallel plane to the plane of said one panel.

* * * * *